United States Patent [19]
Pedersen

[11] Patent Number: 4,703,534
[45] Date of Patent: Nov. 3, 1987

[54] HOLD-DOWN MECHANISM FOR A DOCK LEVELLER

[75] Inventor: Arne I. Pedersen, Puslinch, Canada

[73] Assignee: Pentalift Equipment Corporation, Guelph, Canada

[21] Appl. No.: 885,000

[22] Filed: Jul. 14, 1986

[51] Int. Cl.[4] ................................................ E01D 1/00
[52] U.S. Cl. ..................................... 14/71.1; 14/71.3
[58] Field of Search ................ 14/71.3, 71.1; 254/393, 254/900; 16/1 C

[56] References Cited

U.S. PATENT DOCUMENTS

| | | | |
|---|---|---|---|
| 2,974,336 | 3/1961 | Kelley | 14/71.3 |
| 3,167,796 | 2/1965 | Layne | 14/71.3 |
| 3,280,414 | 10/1966 | Layne | 14/71.3 |
| 3,316,575 | 5/1967 | Larsen et al. | 14/71.3 |
| 3,662,416 | 5/1972 | Brooks et al. | 14/71.3 |

FOREIGN PATENT DOCUMENTS

2063207  5/1981  United Kingdom ................ 14/71.3

Primary Examiner—Stephen J. Novosad
Assistant Examiner—Matthew Smith
Attorney, Agent, or Firm—Bell, Seltzer, Park & Gibson

[57] ABSTRACT

A mechanical dock leveller having a ramp pivotally connected to a support frame which is raised upwardly by a spring biased device includes a hold-down mechanism for holding the ramp at any desired raised position. The hold-down mechanism includes a frictional brake which seizes the hold-down for the ramp at its desired elevation. The frictional brake yields when additional upward force is exerted on the ramp, such as caused by truck springs during unloading of the truck. This arrangement avoids damage to the ramp construction and is accomplished by a durable friction braking system which provides for a controlled infinite raising of the ramp due to truck bed elevation.

12 Claims, 7 Drawing Figures

HOLD-DOWN MECHANISM FOR A DOCK LEVELLER

FIELD OF THE INVENTION

This invention relates to mechanical dock levellers and in particular the hold-down mechanism used on such mechanical dock levellers.

BACKGROUND OF THE INVENTION

Mechanical dock levellers are used very extensively to bridge a height differential between a truck bed and a loading dock. The dock leveller includes a ramp pivotally connected to a support structure. A spring biased device is used to raise the ramp to enable a truck to back up to the dock. The ramp is then lowered onto the truck bed usually by way of a person walking up onto the ramp to overcome the upward spring bias of the raising device. To hold the dock leveller ramp at the height of the truck bed, a hold-down mechanism is used which holds the ramp at the truck bed height against the upward spring biasing force of the raising device. Assuming that the ramp is adjusted for the height of the truck bed when fully loaded, then it is a common occurrence for the truck bed to rise as it is unloaded due to the lightening of the load and the truck springs pushing upwardly on the truck bed. Such upward raising of the truck bed can exert considerable forces on the ramp. Attempts have been made to include provision for allowing the ramp to rise without causing damage to the hold-down mechanism.

As disclosed in U.S. Pat. No. 3,316,575 to Blue Giant Equipment, the hold-down mechanism has a reel for paying out and reeling in a cable, which is connected at its free end to the ramp. The hold-down mechanism is secured to the bottom of the support frame. A knurled wheel is positioned to wedge between the reel circumferential ledge and a wedge portion of the hold-down device. When the knurled wheel is wedged in place, rotation of the reel in a cable pay out direction is prevented. To provide for desired elevation of the ramp, the knurled wheel is moved out of the wedged position by an appropriate release device. To accommodate the raising of the truck bed during unloading, the cable is connected to a spring which provides for a slight degree of ramp elevation without causing damage. However as the truck bed rises, greater force is exerted on the hold-down mechanism as tension in the spring increases. As is appreciated, an appropriate balance between the tension in the spring and the ability to hold the ramp in the desired position without bouncing must be achieved. Furthermore, the spring cannot always accommodate excessive rise in some types of truck bed systems so that excessive forces are exerted on the hold-down mechanism which usually breaks the mechanism. Another problem with the spring system is that the hold-down mechanism does not adjust to the elevated heights of the truck bed. As soon as the truck pulls away from the dock, the extended spring forces the dock leveller ramp to slam downwardly thereby exerting additional forces on the hold-down mechanism which can cause damage to it.

An alternative mechanism is disclosed in Smith et al, U.S. Pat. No. 4,126,909. A resilient biasing of the hold-down is provided to accommodate elevation of the truck bed. A coiled spring permits upward movement of the ramp as a truck is unloaded. A crank is connected to the coiled spring which is swung clockwise away from a stop in opposition to the resilient urging of the torsion spring as the truck bed rises. The coiled spring, as it is wound tighter, acts through the link arm to urge continually the ramp downwardly onto the truck bed. However, the coiled spring arrangement is not readily adjusted as it weakens and suffers from the same problems as the spring system in U.S. Pat. No. 3,316,575. Attempts have been made by Smith et al to avoid the coiled spring arrangement by setting up other spring designs. However, as the springs wear out the effectiveness of the hold-down mechanism deteriorates.

A variety of hold-down mechanisms for dock levellers also incorporate one type or another of ratchet arrangement, such as disclosed in U.S. Pat. No. 4,531,248. To accommodate rising of the truck bed, the hold-down mechanism may be automatically released to permit the ramp to rise. The ratchet system is mounted on a spring loaded piston. As the ramp rises, the spring loaded piston is compressed until a shortened length of chain becomes taut to release the hold-down mechanism. The ramp will then spring up until the spring loaded piston resumes its normal position at which point the chain becomes relaxed and re-engages the ratchet. The problem with this arrangement is undue wear caused in the ratchet teeth due to the constant releasing and re-engaging of the ratchet during unloading of the truck. As the teeth become worn, the system can be dangerous because the teeth do not engage properly resulting in the ramp rising well above the truck bed which can cause an upset of a forklift truck.

To avoid the hold-down mechanism of the mechanical dock leveller interfering with the raising of the truck bed, a system was developed by Zajac et al, U.S. Pat. No. 3,249,956 which allows the ramp to float upwardly free of the ramp raising device and is held in any one position by the hold-down mechanism. The ramp raising device includes two spring loaded arms, one of which can be held at any position by a hold-down mechanism. The hold-down mechanism comprises a friction brake which, when released, allows the one arm to swing upwardly to raise the ramp in conjunction with the other spring loaded arm to its uppermost position. The ramp may be lowered to any desired height and with the hold-down engaged and weight on the ramp, the hold-down will hold the ramp in the desired position. As the truck bed rises, due to unloading of the truck, the ramp will elevate upwardly away from the ramp raising arm having the hold-down device. Hence no modification is required in the hold-down mechanism to compensate for this raising of the ramp away from the ramp raising arm. However, this system requires the use of an elaborate frictional brake design to withstand the loads exerted on the hold-down mechanism by the spring system which elevates the ramp. The system requires the use of two sets of springs with the hold-down functional on only one set of the springs. In this manner, one set of springs does not provide sufficient upward bias to raise the ramp whereas both sets of springs in combination have sufficient upward force to raise the ramp. When the truck pulls away from the dock, the ramp is then free to fall onto the ramp raising mechanism which can cause damage to it.

Layne, U.S. Pat. No. 3,167,796 discloses a ratchet wheel and pawl arrangement for use as the hold-down mechanism in holding the ramp at any desired height. Cables are wound around the ratchet wheel such that as the ramp rises and a first cable is payed out, a second cable is reeled in to act as a return for the ratchet wheel when the ramp moves downwardly to reel in the first cable. The first cable is wound around a spring loaded sheave to accommodate upward movement of the ramp due to elevation of the truck bed. Such upward movement of the ramp avoids damaging the hold-down mechanism. However, the extent of upward movement is limited by the extent of travel of the spring loaded sheave.

SUMMARY OF THE INVENTION

According to an aspect of the invention, a mechanical dock leveller comprises a ramp, a support structure, means for pivotally connecting the ramp to the support structure, means for spring biasing the ramp to pivot the ramp upwardly and a hold-down mechanism for holding the ramp at any desired height against an upward force exerted by the spring biasing means. The hold-down mechanism comprises means for interconnecting the ramp to the support frame. The interconnecting means is extensible and retractable as the ramp is pivoted either respectively upwardly or downwardly. A friction-type brake is connected to the interconnecting means for braking upward pivoting of the ramp at any desired height by seizing extension of the interconnecting means. The brake has a predetermined braking power which is sufficient to hold the ramp at a desired height against the upward force exerted by the resilient biasing means. The brake comprises opposing brake body portions and means for pressing the body portion into frictional engagement with sufficient pressure to provide the predetermined braking power. The pressing means provides for controlled slippage between the body portions when an additional upward force is exerted on the ramp which overcomes the predetermined braking power to pivot the ramp upwardly. Means is provided for selectively releasing the brake to permit upward pivoting of the ramp by the spring biasing means.

According to another aspect of the invention, a mechanical dock leveller comprises a ramp, a support structure, means for pivotally connecting the ramp to the support structure, means for spring biasing the ramp to pivot upwardly and a hold-down mechanism for holding the ramp at any desired height against an upward force exerted by the spring biasing means. The hold-down mechanism comprises a frame with means for mounting the frame on the dock leveller. A reel and means for rotatably mounting the reel on the frame is provided. A cable is wound about the reel. The cable and reel constitute an interconnection between the ramp and the support structure. Means is connected to the reel for resiliently urging the reel to rotate in a direction which reels in the cable when the ramp is pivoted upwardly and has payed off cable from the reel. Means is provided for braking rotation of the reel relative to the frame. Means is in operative association with the brake means and the reel for engaging the reel with the brake means when the reel is rotated in a cable pay-out direction and for disengaging the reel from the brake means when the reel is rotated in a cable reel-in direction. Means is provided for selectively releasing the brake means when the means engages the reel with the brake means to permit rotation of the reel in a cable pay-out direction and thereby allowing the spring biasing means to pivot the ramp upwardly. The means resiliently urging the reel to rotate in the cable reel-in direction does so when the ramp is pivoted downwardly. The brake means has a predetermined braking power which holds the ramp at any desired height against an upward force exerted by the spring biasing means. The brake means yields and permits reel-out of cable when an upward force in addition to the upward force exerted by the spring biasing means overcomes the predetermined braking power of the brake means.

According to another aspect of the invention, a hold-down mechanism for use on a mechanical dock leveller to hold a dock leveller ramp at any desired height against an upward ramp raising force exerted by a ramp raising device comprises a frame with means for mounting the frame to a dock leveller and a reel and means for rotatably mounting the reel on the frame. A cable is wound about the reel. Means is connected to the reel for resiliently urging the reel to rotate in a direction which reels in the cable after cable has been paid off of the reel. Means brakes rotation of the reel relative to the frame. Means is provided in operative association with the brake means and the reel for engaging the reel with the brake means when the reel is rotated in a cable pay-out direction and for disengaging the reel from the brake means when the reel is rotated in a cable reel-in direction. Means is provided for selectively releasing the brake means when the means engages the reel with the brake means to permit rotation of the reel in a cable pay-out direction. The brake means is a frictional brake and has a predetermined braking power.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
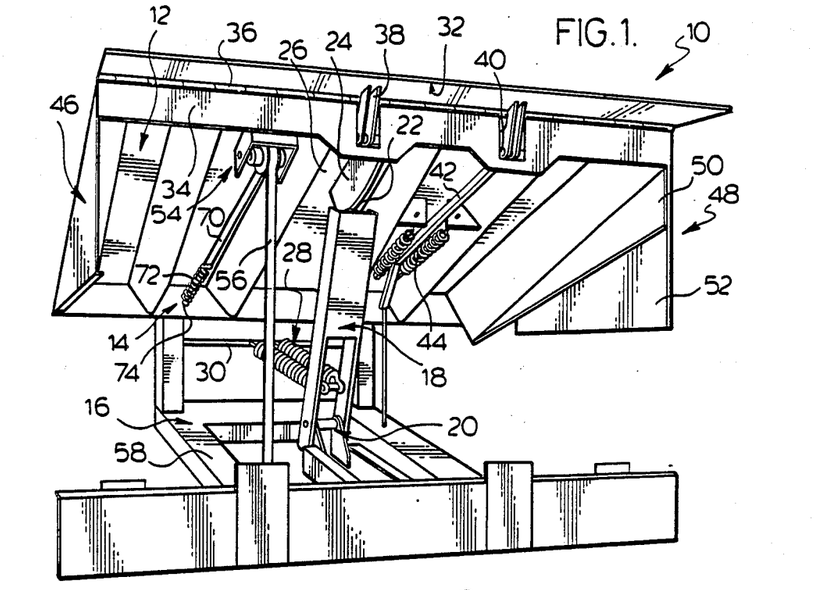
FIG. 1 is a perspective view of the mechanical dock leveller having the hold-down mechanism according to this invention.

A mechanical dock leveller is to be distinguished from a hydraulic dock leveller on the basis that mechanical means is the sole device for raising the dock leveller upwardly to permit a truck to back up to the dock for purpose of unloading. As shown in FIG. 1, a mechanical dock leveller 10 comprises a ramp 12 which is pivotally connected at its rear portion 14 to a support frame 16. Normally the support frame 16 is mounted in a pit provided in the cement dock or other receiving area. According to this embodiment, the ramp 12 is swung upwardly by means of a resiliently biased swing arm 18. The swing arm 18 is pivotally mounted at 20 to the support frame 16. The swing arm 18 has at its upper end a roller 22 which engages a cam 24 mounted on the underside 26 of the ramp 12. The resilient bias for the swing arm 18 is provided by a pair of springs 28 which are connected to a cross-member 30 of the support frame 16. As is common on many dock levellers, the ramp 12 may include a lip 32 which is hinged to the front portion 34 of the ramp by a piano-style hinge 36. The lip may be extended by way of the cam 24 being pivotally mounted to the underside 26 of the ramp such that, as the arm 18 swings upwardly, the cam 24 pivots to engage a linkage 38 which swings the lip upwardly until a stop at 40 is engaged. To prevent damage to the lip 32, the stop 40 engages a spring loaded member 42. If the lip 32 is engaged by the back of the truck, the spring 44 absorbs the shock and permits the lip to swing downwardly to avoid damage of same.

To provide for protection at the sides of the ramp, skirt portions 46 and 48 are provided. Each skirt portion consists of two sections 50 and 52 which are pivoted together and fall downwardly as the ramp rises to prevent toe injury when the ramp is lowered onto the truck bed.

A hold-down mechanism 54 is provided on the dock leveller to hold the ramp at any desired height against the upward bias exerted by springs 28. With the hold-down mechanism 54 released, the swing arm 18 will pivot the ramp 12 to its uppermost position as shown in FIG. 1. After the truck is backed up to the dock, a person may walk onto the dock leveller and overcome the upward bias of the springs 28 to lower the ramp downwardly until the lip 32 engages the truck bed. As is standard practice, the hold-down mechanism 54 accommodates such downward pivoting of the ramp. Once the lip 32 engages the truck bed and the person jumps off the ramp, the hold-down mechanism 54 is engaged in a manner to prevent the ramp from raising upwardly under the influence of the spring biased arm 18.

According to this embodiment, the hold-down mechanism 54 is mounted to the underside 26 of the ramp. A cable 56, which according to this embodiment is in the form of a flexible strap, interconnects the hold-down mechanism 54 to the base portion 58 of the dock leveller support 16.

Figure 2:
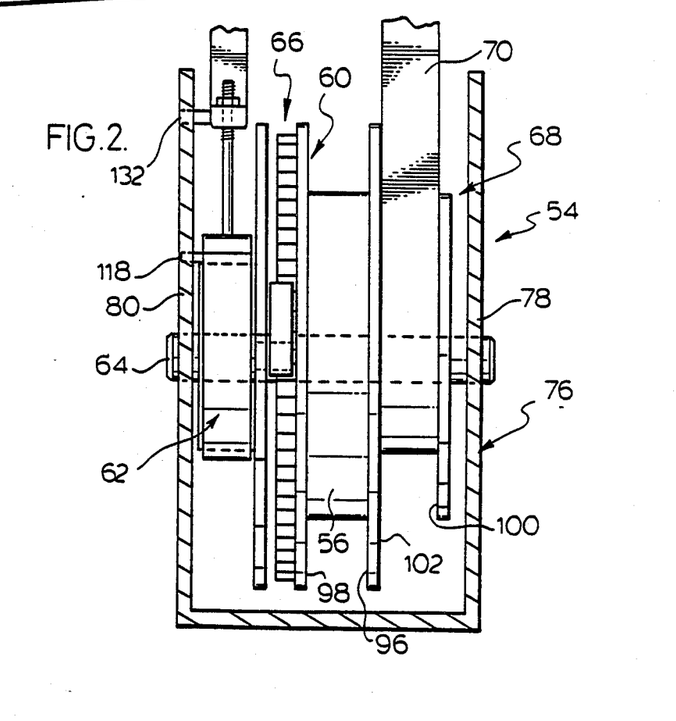
FIG. 2 is a top plan view of the hold-down mechanism for the dock leveller of FIG. 1.

As shown in FIG. 2, the hold-down mechanism 54 has a reel 60 about which cable 56 is wound. According to this particular embodiment, the cable in the form of a strap is approximately one inch wide and sufficiently thin to facilitate reeling in and paying out of the cable on the reel 60. A brake 62 is provided on the axle 64 of the hold-down mechanism. The reel 60 is mounted on the same axle so as to be concentric with the brake 62. A wheel ratchet and pawl arrangement 66 is provided for engaging the brake with the reel 60 when the reel is rotated in a cable pay-out direction, but disengages the reel from the brake when the reel is rotated in a cable reel in direction. When the ramp 12 is lowered, the hold-down mechanism is adapted to reel in the cable 56. According to this embodiment, a spool 68 has a cord 70 also in the form of a strap wound about the spool. The cord 70, as shown in FIG. 1, extends rearwardly of the ramp and is connected to a spring 72 which in turn is connected to the rear portion 14 of the ramp at 74. When cable 56 is payed off of the reel 60, the spool 68, as connected to the reel 60, rotates in the same direction which winds the cord 70 onto the spool thereby extending the tension spring 72. Whenever the ramp is lowered, the tension in spring 72 causes the spool 68 to rotate in a direction which reels in the cable 56. The spool, reel, brake engaging mechanism and brake are all mounted on the hold-down mechanism frame 76. The spool, reel and brake are rotatably mounted on the axle 64 which is in turn mounted in the frame side walls 78 and 80.

Figure 3:
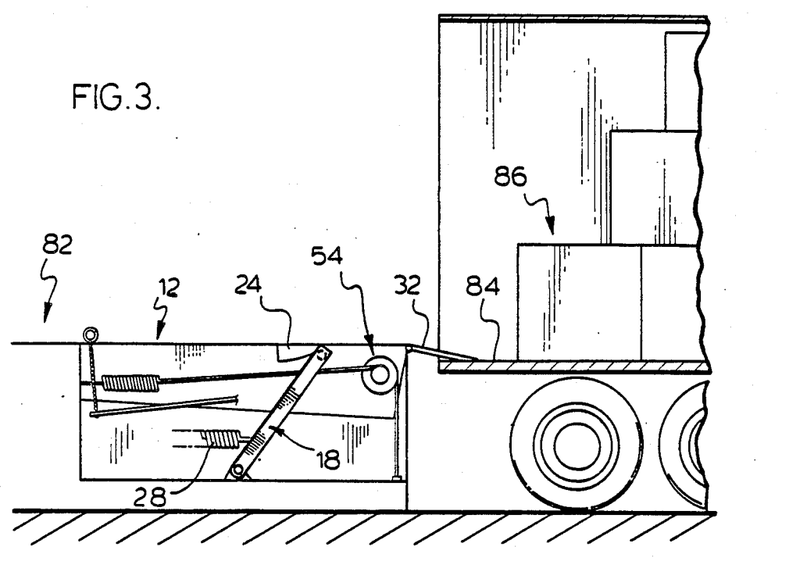
FIG. 3 is a side elevation of the dock leveller of FIG. 1 with the ramp lip resting on a truck bed.
Figure 4:
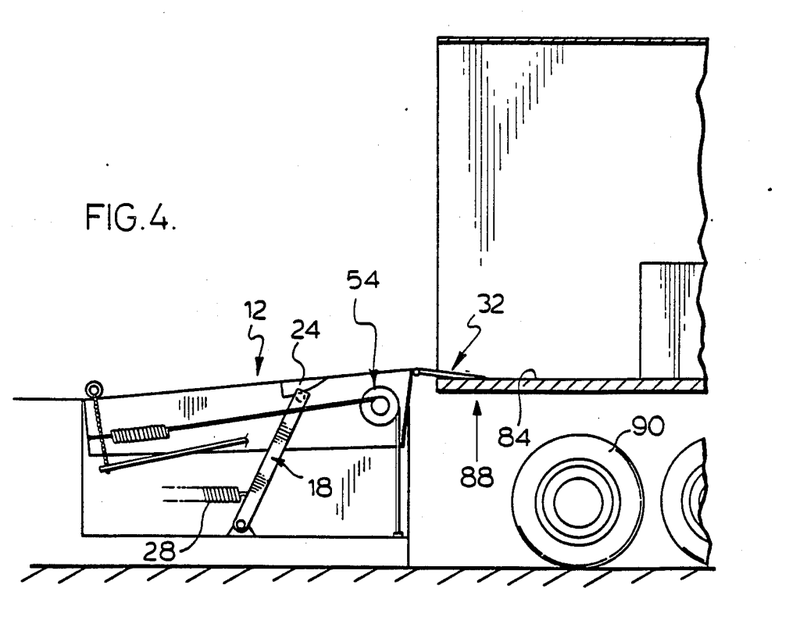
FIG. 4 is side elevation similar to that of FIG. 3 showing the truck bed in the raised position after having been unloaded.

With reference to FIGS. 3 and 4, the effect that the truck bed has on the ramp when the truck is unloaded is demonstrated. After a truck has been backed up to the dock 82 and the ramp 12 lowered to place the lip 32 on the truck bed 84, the hold-down mechanism 54 holds the ramp in place. The hold-down mechanism 54 has sufficient braking power to prevent the swing arm 18 from swinging the ramp upwardly due to the resilient bias of springs 28. A forklift truck or the like can readily run from the dock 82 over the ramp 12 and lip 32 onto the truck bed to remove the cargo 86 from within the truck. As the cargo is removed from the truck, the truck bed 84 rises in the direction of arrow 88, as shown in FIG. 4, due to the spring mounting of the truck bed 84 relative to an axle for the truck tires 90. The hold-down mechanism 54 is designed in a manner to accommodate such upward movement of the truck bed 84 in the direction of arrow 88 without damaging the ramp 12, the lip 32 or the hold-down mechanism 54.

Figure 5:
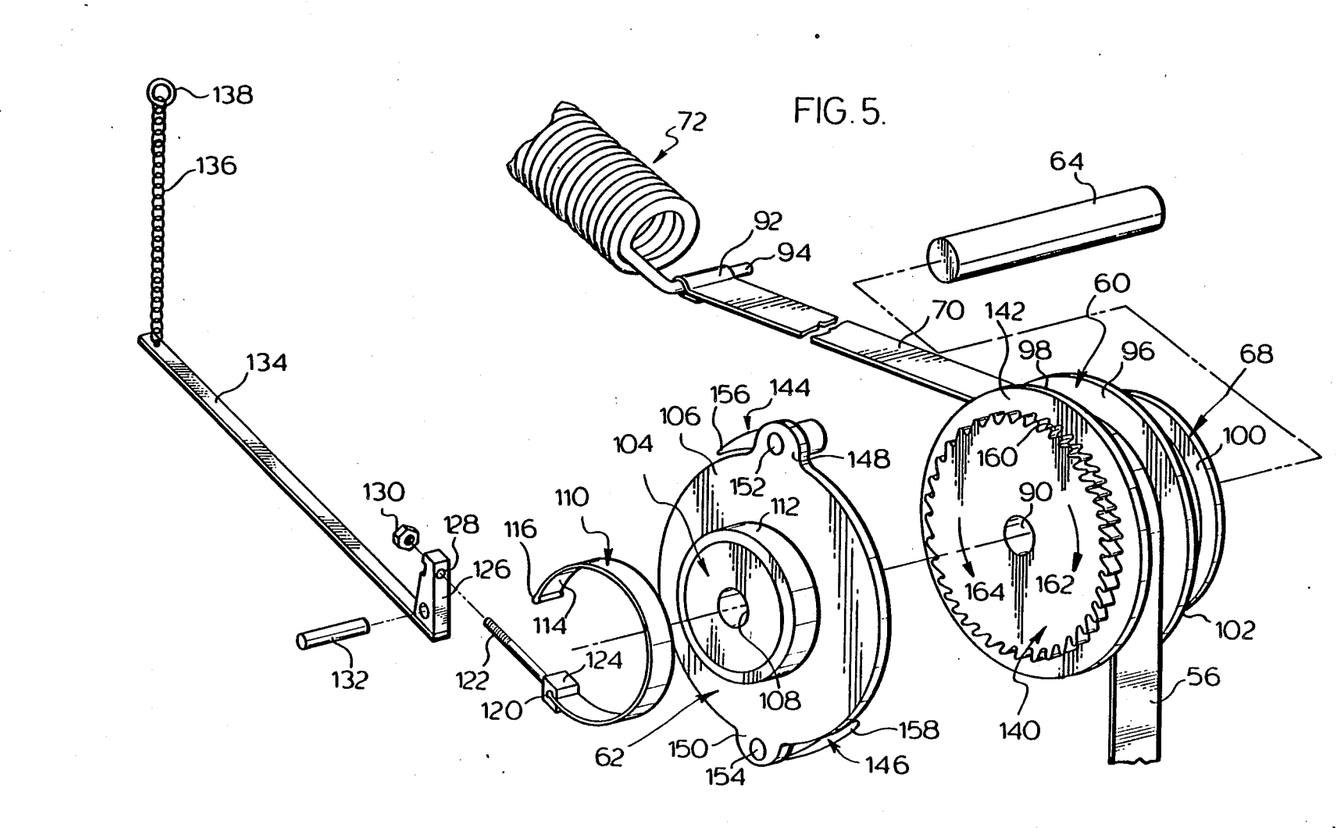
FIG. 5 is an exploded perspective view of the hold-down mechanism of this invention; and, FIG. 6 is a side elevation of the dock leveller of FIG. 1 with the side skirt portion removed to show details of the ramp raising mechanism and the hold-down mechanism.

With reference to FIG. 5, details of the hold-down mechanism are shown. According to this embodiment the reel 60 for the cable 56 is directly connected to the spool 68 for the cord 70. As already noted in accordance with this embodiment of the invention, the cable 56 is constituted by a strap made of woven synthetic material, such as Nylon (trade mark) or polypropylene. Cord 70 may be made from the same material. The strap 56 has sufficient tensile strength to resist elongation and breakage under the considerable forces exerted by the spring loaded swing arm 18. A bore 90 extends through the interconnected reel 60 and spool 68. The axle 64, which is mounted in the frame 76, extends through the bore 90 to provide for rotatable mounting of the reel and spool on the frame of the hold-down mechanism. The cord 70, as it extends rearwardly of the ramp from the spool 68, has a looped end portion 92 which is secured around the L-shaped end 94 of the spring 72 to provide for interconnection of the cord 70 to the spring 72. As the cable 56 is paid out from the reel 60, the cord 70 is wound onto the spool 68 thereby extending the tension spring 72 and providing a resilient urging on the wheel 60 to rotate it in the direction which would reel the cable 56 in as the ramp is lowered. Both the reel and the spool consist of cylindrical base portions to which the cable and cord are attached. The spool 60 has opposing upright side walls 96 and 98 to guide the reeling in of the cable 56. Similarly spool 68 has opposing side walls 100 and 102 which guide the reeling in of the cord 70.

The brake 62, according to this embodiment, comprises a brake drum 104 which is integral with circular plate 106. The brake drum 104 has a bore 108 extending therethrough to permit mounting on the axle 64. A brake band 110 encircles a portion of the cylindrical surface 112 of the brake drum. The band includes on its underside 114 a brake pad for frictionally engaging the surface 112 of the brake drum. The free end 116 of the brake band is secured to the frame 76 by pin 118, as shown in more detail in FIG. 2. The other end 120 of the brake band is connected to threaded rod 122 by coupling block 124. The threaded rod 122 is coupled to fulcrum block 126 by extending through bore 128 and fastened by lock nut 130. The fulcrum block 126 is pivotally mounted on the frame 76 by the pin 132 as also shown in FIG. 2. An extended lever arm 134 extends rearwardly of the ramp from the pivot point 132 to almost the rear of the ramp. A pull chain 136 with a finger grip 138 is accessible from the top of the ramp 12 in the manner to be discussed with respect to FIGS. 6 and 7 to effect release of the brake 62. The length of the lever arm 134 is such that under its own weight, it pivots downwardly about pin 132, pulling on the rod 122 to draw the brake band 110 tightly into contact with the brake drum 104. The frictional contact between the faces 112 of the drum and 114 of the band effectively brake the plate 106 from rotating on the axle 64. Hence the weight of the lever arm 134 is selected to provide the desired degree of braking power on the brake drum by way of determining the frictional engagement between the two brake components.

According to this embodiment, the device, which engages the reel 60 with the brake drum 104 and hence with the brake 62 when the brake is on, comprises a ratchet wheel 140 secured to the outer surface 142 of the reel 60. The bore 90 extends through the ratchet wheel 140 and hence is concentric with the axis of rotation of the reel 60. The plate 106 includes two spring loaded pawls 144 and 146. The plate 106 includes lobes 148 and 150. Pawl 140 is pivotally mounted to lobe 148 by pin 152. Similarly, pawl 146 is pivotally mounted to lobe 150 by pin 154. Pawls 144 and 146 have teeth portions 156 and 158 which extend in a direction to engage the depressions between the ratchet teeth 160 of the ratchet wheel 140. The pawl and ratchet wheel is designed so that the pawls engage the ratchet wheel and thereby indirectly connect the reel 60 to brake drum 104 when the reel 60 is rotated in the direction of arrow 162. This is the direction of rotation for the reel which pays out the cable 56. In the opposite direction of rotation 164, the reel 60 is disengage from the brake since the pawls, which are spring loaded towards the teeth 160 of the ratchet wheel, slide over the ratchet teeth to permit reeling in of the cable 56.

With this type of ratchet and pawl arrangement, which engages the reel 60 with the brake 62, there are only two possible circumstances in which the reel 60 can rotate in the direction of arrow 162. The first circumstance is to lift on the lever arm 134 by pulling on the chain 136 to release the brake 62 and thereby allow the reel 60 to rotate freely in the direction of arrow 162. The second circumstance in which the reel 60 may rotate in the direction of arrow 162 is if there is sufficient downward pulling force exerted by the cable 56 on the reel 60 that the frictional engagement of the brake band 110 with the brake drum surface 112 is overcome. In this instance, the surface 112 of the brake drum will slip over the brake pad surface 114 only when their frictional engagement is overcome and only while the additional force on cable 56 is maintained. By adjusting the position of rod 122 relative to the fulcrum block 126, the angle of inclination of the arm 134 may be adjusted to keep its free end off of the pit floor. By providing the desired braking power determined by the selected weight for the arm 134, movement of the reel 60 in the direction of arrow 162 is only accomplished when extreme forces are exerted on the cable, such as caused by a truck bed 84 rising in the direction of arrow 82 as shown in FIG. 4.

Figure 6:
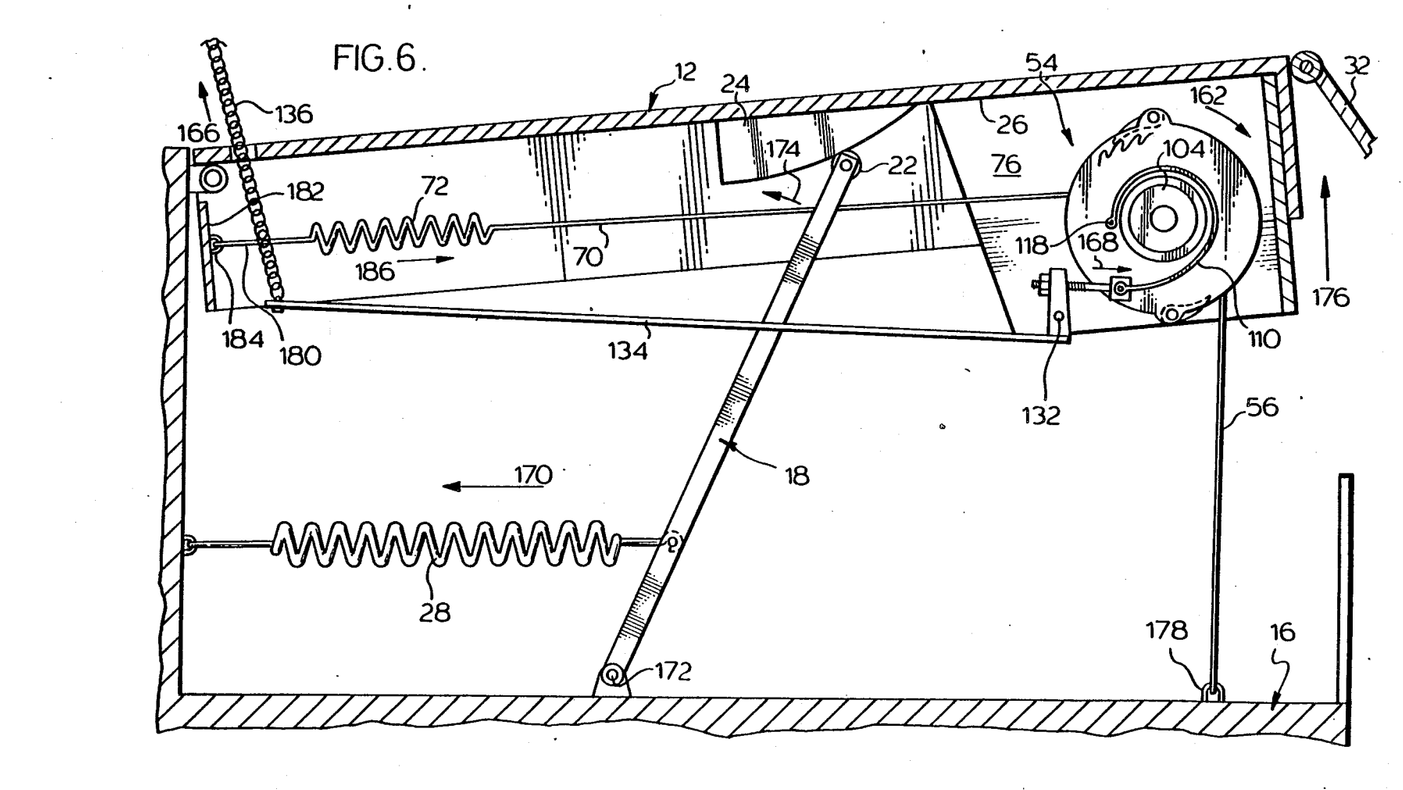
Figure 7:
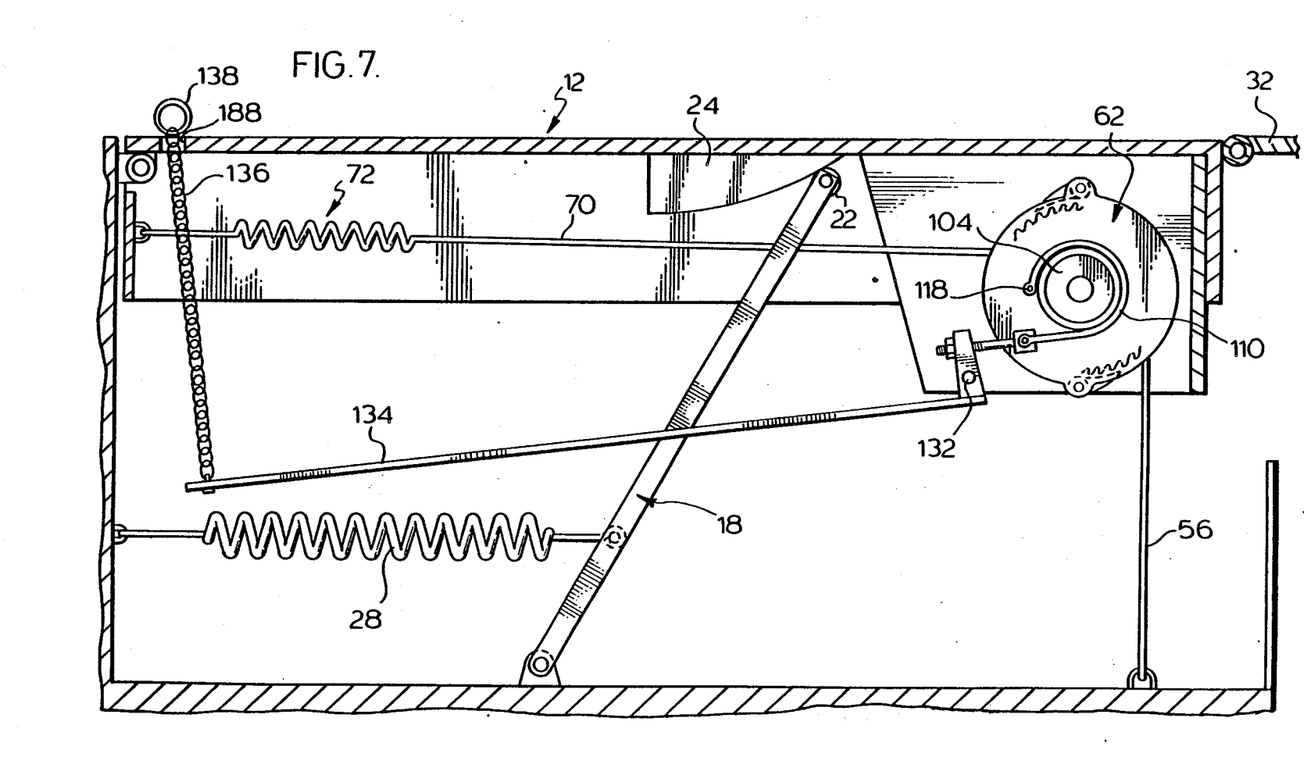
FIG. 7 is a side elevation of the ramp of FIG. 6 only in the lowered position with the hold-down mechanism engaged.

The overall relationship of the hold-down mechanism relative to the operation of the ramp is shown in FIGS. 6 and 7. When it is desired to raise the ramp 12, the pull chain 136 is pulled upwardly in the direction of arrow 166 to pivot the lever arm 134 about pin 132 in the direction of arrow 168 which moves the the brake band 110 off of the brake drum 104 to thereby release the reel 60. With the reel 60 released, the swing arm 18, which is biased in the direction of arrow 170 by large springs 28, pivots about point 172 in the direction of arrow 174 to cause the roller 22 to ride along the surface of the cam 24 which causes elevation of the ramp 12 in the direction of arrow 176. The frame 76 for the hold-down mechanism 54 is mounted to the underside 26 of the ramp by suitable fastening devices. The cable 56, as it extends from the reel of the hold-down, has its free end fastened to the structure 16 by loop 178. Cord 70, as it extends rearwardly of the hold-down mechanism 54, is connected to the spring 72. The rear portion of the spring 180 is connected to the ramp rear wall 182 by fastener 184. As the swing arm 18 elevates the ramp 12 in the direction of arrow 176, cable 56 is paid off of the reel as the reel rotates in the direction of arrow 162. At the same time, cord 70 is wound onto the spool 68 so as to extend the tension spring 72 in the direction of arrow 186. The spring 72 has sufficient travel to stretch the necessary extent to accommodate the length of cable 56 paid off of the reel when the ramp 12 is elevated to its uppermost position as shown in FIG. 1.

With the ramp in the elevated position, it is necessary to lower the lip onto the truck bed to the position shown in FIG. 3. To accomplish this, in the usual manner with mechanical dock levellers, a person walks onto the ramp 12. The person's weight is sufficient to overcome the bias of the springs 28 in swinging the arm 18 upwardly thereby causing extension in the tension spring 28 and lowering the lip 32 onto the truck bed 84. During this downward movement of the ramp 12, slack in the cable 56 must be taken up by the reel 60. This is accomplished by the spring 72 resiliently urging the cord 70 to reel in the cable 56 in the direction 164. As shown in FIG. 7, the cable 56 has been wound in as the coil spring 72 pulls the cord 70 rearwardly of the ramp 12. During this winding in of the cable 56, the brake 62 is fully engaged with the pull chain 36 in its lowermost position with the ring 138 acting as a stop at the opening 188. In this position, the brake band 110 is in frictional engagement with the brake drum 104. Take up of the cable 56 onto the reel 60 is permitted, however, by the spring loaded pawls 144 and 146 as they pass over the ratchet teeth 160 of the ratchet wheel 140 so that in lowering the ramp a clicking noise is developed indicating that the reel is taking in the cable 56. As soon as the ramp is positioned at the desired height, the spring loaded pawls engage the teeth 160 of the ratchet wheel 140 to thereby engage the reel 60 with the brake 62. As explained, the brake 62 develops sufficient brake force to resist the upward forces exerted by the tension springs 28 to hold thereby the ramp 12 at the desired elevation.

In accordance with this invention, a predetermined braking power is provided by selecting the proper weight for arm 134. As the brake pad 114 wears, the arm 134 may be raised to maintain the desired braking power by simply tightening the block nut 130. The braking power of the brake 62 is adjusted so that upward pressure exerted on the ramp by a raising truck bed or any other force is accommodated by providing controlled slippage between the brake band and the brake drum. The slippage of the brake avoids damage to the ramp lip or the hold-down mechanism. By providing controlled slippage of the brake drum, the ramp may be raised by undue forces to any desired height without any gradual increase in upward forces required to continue elevating the ramp. Hence with the hold-down mechanism installed, the frictional engagement of the brake is adjusted to provide for the necessary controlled slippage to accommodate truck bed elevation to any level in the manner shown in FIG. 4. As a result, the controlled slippage in the brake provides for any needed upward travel in the dock without the hold-down mechanism increasing resistance to such upward travel under the force of a raising truck bed. No excessive forces are exerted on the hold-down mechanism which could damage it, because it automatically yields to any excessive force. Furthermore, the hold-down mechanism adjusts to increases in height of the truck bed relative to the dock, eliminating any excessive forces which would tend to pull the ramp down. As a result, when the truck pulls away, the ramp does not slam downward. Instead, the ramp remains at the height of the truck bed when it pulls away.

It is appreciated that many brake designs are available which will yield in a controlled manner to provide for upward movement of the ramp when undue pressures are exerted. For example, a disc brake arrangement may be provided which functions in the same manner as the brake drum arrangement involving pressure between body portions of the brake where a controlled slippage is provided between one brake component and the other when undue forces are exerted upwardly on the ramp. Furthermore, it is appreciated that the ratchet wheel and pawl arrangement in combination with the brake which provides for engagement of the reel 60 with the brake when an attempt is made to pay out the cable 56, can be accomplished by other mechanical devices, such as a clutch mechanism which is actuated to engage the reel with the brake when rotation of the reel 56 commences in a cable pay out direction.

The hold-down mechanism, according to this invention, provides a reliable system which is readily adjustable over years of use. The system is readily maintained since it may be positioned either on the underside of the ramp or on the base of the frame. Hence cleaning, servicing and oiling is readily attended to with the ramp in the up position. The system is of a design which lends itself readily to manufacture and hence realizes significant reduction in manufacturing costs. The parts of the hold-down mechanism are readily accessible and hence easily placed should they become worn or damaged.

Although preferred embodiments of the invention have been described herein in detail, it will be understood by those skilled in the art that variations may be made thereto without departing from the spirit of the invention or the scope of the appended claims.

The embodiments of the invention in which an exclusive property of privilege is claimed are defined as follows:

1. A hold-down mechanism for use on a mechanical dock leveller to hold a dock leveller raised any desired height against an upward ramp raising force exerted by a ramp raising device, said hold-down mechanism comprising a frame and means for mounting said frame to a docke leveller, a reel and means for rotatably mounting said reel on said frame, a cable wound about said real, means connected to said reel for resiliently urging said reel to rotate in a direction which reels in said cable, means for braking rotation of said reel relative to said frame, means for operatively engaging said brake means with said reel when said reel is rotated in a cable pay out direction, said engaging means disengaging said reel from said brake means when said reel is rotated in a cable reel-in direction, means for selectively releasing said brake means when said engaging means engages said reel with said brake means to permit rotation of said reel in a cable pay out direction, said brake means being a frictional brake and having a predetermined braking power.

2. A hold-down mechanism of claim 1, wherein said engaging means comprises a ratchet wheel connected to said reel, a ring adjacent said ratchet wheel, a pawl being mounted on said ring for engaging said ratchet wheel, said ring being mounted on said brake means, said pawl blocking rotation of said ratchet wheel in a cable pay out direction.

3. A hold-down mechanism of claim 2, wherein said brake means is a brake drum, said brake drum having an axis of rotation coincident with said reel, a brake pad for frictionally engaging said brake drum and said release means selectively releasing said brake pad.

4. a hold-down mechanism of claim 1 wherein said means for resiliently urging said reel comprising a cord spool connected to said reel and a cord wound about said spool, a cord end and means connected to said cord and which resiliently extends, said spool winding in said cord as said reel pays out said cable to extend said resilent means and thereby resiliently urge said real in a cable reel end direction.

5. A hold-down mechanism of claim 4, wherein said resilient means is a tension spring.

6. A mechanical dock leveller comprising a ramp, a support structure, means for pivotally connecting said ramp to said support structure, means for spring biasing said ramp to pivot upwardly and a hold-down mechanism comprising a frame with means for mounting said frame on said dock leveller, a reel and means for rotatably mounting said reel on said frame, a cable wound about said reel, said cable and reel constituting an interconnection between said ramp and said support structure, means connected to said reel for resiliently urging said reel to rotate in a direction which reels in said cable when said ramp is pivoted upwardly and has paid off cable from said reel, means for braking rotation of said reel relative to said frame, means for operatively engaging said brake means with said reel when said reel is rotated in a cable pay out direction, said engaging means disengaging said reel from said brake means when said reel is rotated in a cable reel-in direction, means for selectively releasing said brake means when said engaging means engages said reel with said brake means to permit rotation of said reel in a cable pay out direction and thereby allowing said spring biasing means to pivot said ramp upwardly, said means resiliently urging said reel to rotate in said cable reel-in direction when said ramp is pivoted downwardly, said brake means having a predetermined braking power which holds said ramp at any desired height against an upward force exerted by said spring biasing means, said brake means yielding and permitting reel out of cable when an upward force in addition to said upward force exerted by said spring biasing means overcomes said predetermined braking power of said brake means.

7. A mechanical dock leveller of claim 6, wherein said brake means is a frictional type brake, said brake means providing for a controlled slippage when said predetermined braking power is overcome.

8. A mechanical dock leveller of claim 6, wherein said engaging means comprises a ratchet wheel connected to said reel, a ring adjacent said ratchet wheel, a pawl being mounted on said ring for engaging said ratchet wheel, said ring being mounted on said brake means, said pawl blocking rotation of said ratchet wheel in a cable pay out direction.

9. A mechanical dock leveller of claim 6, wherein said brake means is a brake drum, said brake drum having an axis of rotation coincident with said reel, a brake pad for frictionally engaging said brake drum and said release means selectively releasing said brake pad.

10. A mechanical dock leveller of claim 6, wherein said means for resiliently urging said reel comprising a cord spool connected to said reel and a cord wound about said spool, a cord end being connected to means which resiliently extends, said spool winding in said cord a said reel pays out said cable to extend said resilient means and thereby resiliently urge said reel in a cable reel in direction.

11. A mechanical dock leveller claim 10, wherein said resilient means is a tension spring.

12. A mechanical dock leveller of claim 6, wherein said mounting means mounts said frame to an underside of said ramp proximate its distal end, an end of said cable being connected to said support structure beneath said ramp.

* * * * *